(12) United States Patent
Odell et al.

(10) Patent No.: US 7,930,183 B2
(45) Date of Patent: Apr. 19, 2011

(54) AUTOMATIC IDENTIFICATION OF DIALOG TIMING PROBLEMS FOR AN INTERACTIVE SPEECH DIALOG APPLICATION USING SPEECH LOG DATA INDICATIVE OF CASES OF BARGE-IN AND TIMING PROBLEMS

(75) Inventors: Julian J. Odell, Kirkland, WA (US); Stephen F. Potter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1143 days.

(21) Appl. No.: 11/392,339

(22) Filed: Mar. 29, 2006

(65) Prior Publication Data

US 2007/0239458 A1    Oct. 11, 2007

(51) Int. Cl.
*G10L 15/22* (2006.01)
(52) U.S. Cl. .................................................. 704/275
(58) Field of Classification Search .................. None
See application file for complete search history.

(56) References Cited

U.S. PATENT DOCUMENTS

| | | | | |
|---|---|---|---|---|
| 6,246,986 | B1 * | 6/2001 | Ammicht et al. | 704/270 |
| 6,598,022 | B2 * | 7/2003 | Yuschik | 704/275 |
| 6,651,043 | B2 * | 11/2003 | Ammicht et al. | 704/275 |
| 7,043,435 | B2 * | 5/2006 | Knott et al. | 704/270 |
| 7,069,213 | B2 * | 6/2006 | Thompson | 704/231 |
| 7,194,409 | B2 * | 3/2007 | Balentine et al. | 704/253 |
| 7,383,170 | B2 * | 6/2008 | Mills et al. | 704/9 |
| 2006/0129397 | A1 | 6/2006 | Li | |
| 2008/0004881 | A1 * | 1/2008 | Attwater et al. | 704/275 |

OTHER PUBLICATIONS

U.S. Appl. No. 11/168,278, filed Jun. 2005, Odell et al.
U.S. Appl. No. 11/170,808, filed Jun. 2005, Potter.
U.S. Appl. No. 11/170,860, filed Jun. 2005, Potter.
U.S. Appl. No. 11/170,945, filed Jun. 2005, Potter et al.
U.S. Appl. No. 11/253,047, filed Oct. 2005, Ramakrishna.

* cited by examiner

*Primary Examiner* — Talivaldis Ivars Smits
(74) *Attorney, Agent, or Firm* — Merchant & Gould

(57) ABSTRACT

A method of analyzing dialog between a user and an interactive application having dialog turns is provided. The method includes accessing information indicative of a plurality of dialog turns between the application and at least one user and identifying instances where the application determined a response was received before an associated prompt had completed. The accessed information includes information related to operation of the application with a first grammar to recognize the response. The method includes identifying whether the response was received in a particular limited time period from when the associated prompt began. If the response was received in the limited time period, the method determines whether the response included one or more terms from the associated prompt by performing recognition on the response using a second grammar having more information related to grammar of a language than the first grammar.

18 Claims, 9 Drawing Sheets

AUTOMATIC IDENTIFICATION OF DIALOG TIMING PROBLEMS FOR AN INTERACTIVE SPEECH DIALOG APPLICATION USING SPEECH LOG DATA INDICATIVE OF CASES OF BARGE-IN AND TIMING PROBLEMS

BACKGROUND

The discussion below is merely provided for general background information and is not intended to be used as an aid in determining the scope of the claimed subject matter.

Small computing devices such as personal digital assistants (PDA), devices and portable phones are used with ever increasing frequency by people in their day-to-day activities. With the increase in processing power now available for microprocessors used to run these devices, the functionality of these devices is increasing, and in some cases, merging. For instance, many portable phones now can be used to access and browse the Internet as well as can be used to store personal information such as addresses, phone numbers and the like.

In view that these computing devices are being used with increasing frequency, it is therefore necessary to provide an easy interface for the user to enter information into the computing device. Unfortunately, due to the desire to keep these devices as small as possible in order that they are easily carried, conventional keyboards having all the letters of the alphabet as isolated buttons are usually not possible due to the limited surface area available on the housings of the computing devices. Even beyond the example of small computing devices, there is interest in providing a more convenient interface for all types of computing devices.

To address this problem, there has been increased interest and adoption of using voice or speech to access information, whether locally on the computing device, over a local network, or over a wide area network such as the Internet. With speech recognition, a dialog interaction is generally conducted between the user and the computing device. The user receives information typically audibly and/or visually, while responding audibly to prompts or issuing commands. However, it is often desirable to ascertain the performance of the application during development or after it has been deployed. In particular, it is desired to ascertain usage and/or success rates of users with the application. With such information, the developer may be able to "tune" (i.e. make adjustments) to the application in order to better meet the needs of the users of the applications. For example, it may be helpful to identify portions of the dialog between the application and the users where problems are most likely to be encountered. In this manner, those portions of the dialog can be adjusted to alleviate confusion.

Recording or logging interaction data between the application and the user(s) is done to measure performance of the application. However, in general, logging application interaction data may suffer from any one or combination of the following drawbacks to name just a few: (1) the data is cumbersome to generate, that is, the application developer must take care to instrument (i.e. define and implement a set of messages used to log system data) the application in a variety of locations in the code in order to acquire the correct data for analysis and tuning; (2) the instrumentation process is typically done in an application-specific manner, and is not portable across different applications; and (3) the interaction log data is of limited value unless a manual transcription process (and/or other explicit human intervention) is applied, which annotates the data with richer information on the intent of the user.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

A speech application is analyzed to automatically identify timing problems therein. Information related to the application is recorded and problems are identified. A recognizer can be utilized to perform recognition on the recorded information.

DETAILED DESCRIPTION

Figure 1:
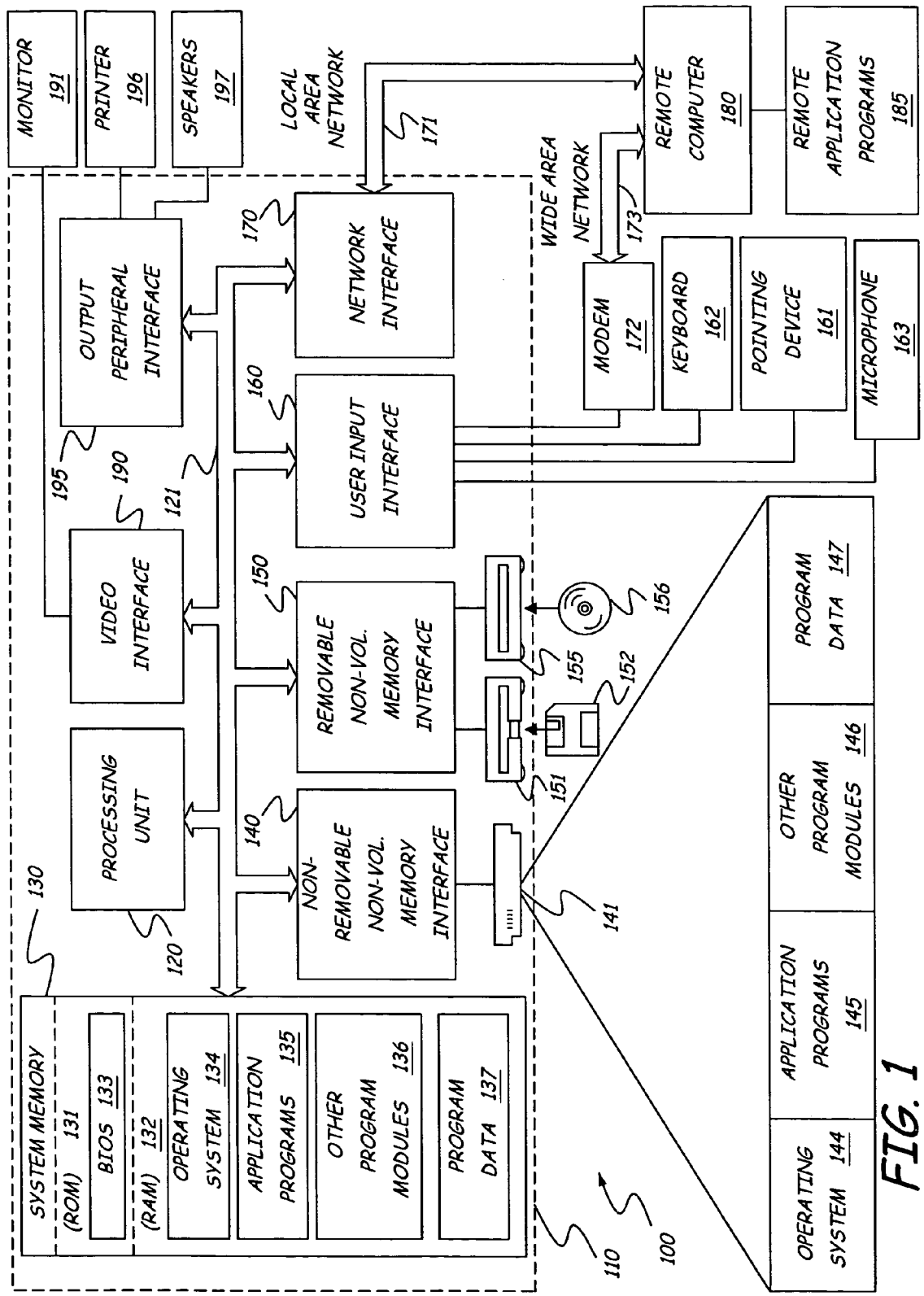
FIG. 1 is a block diagram of a general computing environment.

FIG. 1 illustrates an example of a suitable computing system environment 100. The computing system environment 100 is only one example of a suitable computing environment and is not intended to suggest any limitation as to the scope of use or functionality of the concepts presented herein. Neither should the computing environment 100 be interpreted as having any dependency or requirement relating to any one or combination of components illustrated in the exemplary operating environment 100.

The concepts presented herein are operational with numerous other general purpose or special purpose computing system environments or configurations. Examples of well known computing systems, environments, and/or configurations that may be suitable for use with the concepts include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts presented herein may be described in the general context of computer-executable instructions, such as program modules, being executed by a computer. Generally, program modules include routines, programs, objects, components, data structures, etc. that perform particular tasks or implement particular abstract data types. The concepts may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the concepts presented herein includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available medium or media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Typically, application programs 155 have interacted with a user through a command line or a Graphical User Interface (GUI) through user input interface 180. However, in an effort to simplify and expand the use of computer systems, inputs have been developed which are capable of receiving natural language input from the user. In contrast to natural language or speech, a graphical user interface is precise. A well designed graphical user interface usually does not produce ambiguous references or require the underlying application to confirm a particular interpretation of the input received through the interface 180. For example, because the interface is precise, there is typically no requirement that the user be queried further regarding the input, e.g., "Did you click on the 'ok' button?" Typically, an object model designed for a graphical user interface is very mechanical and rigid in its implementation.

In contrast to an input from a graphical user interface, a natural language query or command will frequently translate into not just one, but a series of function calls to the input object model. In contrast to the rigid, mechanical limitations of a traditional line input or graphical user interface, natural language is a communication means in which human interlocutors rely on each other's intelligence, often unconsciously, to resolve ambiguities. In fact, natural language is regarded as "natural" exactly because it is not mechanical. Human interlocutors can resolve ambiguities based upon contextual information and cues regarding any number of domains surrounding the utterance. With human interlocutors, the sentence, "Forward the minutes to those in the review meeting on Friday" is a perfectly understandable sentence without any further explanations. However, from the mechanical point of view of a machine, specific details must be specified such as exactly what document and which meeting are being referred to, and exactly to whom the document should be sent.

Figure 2:
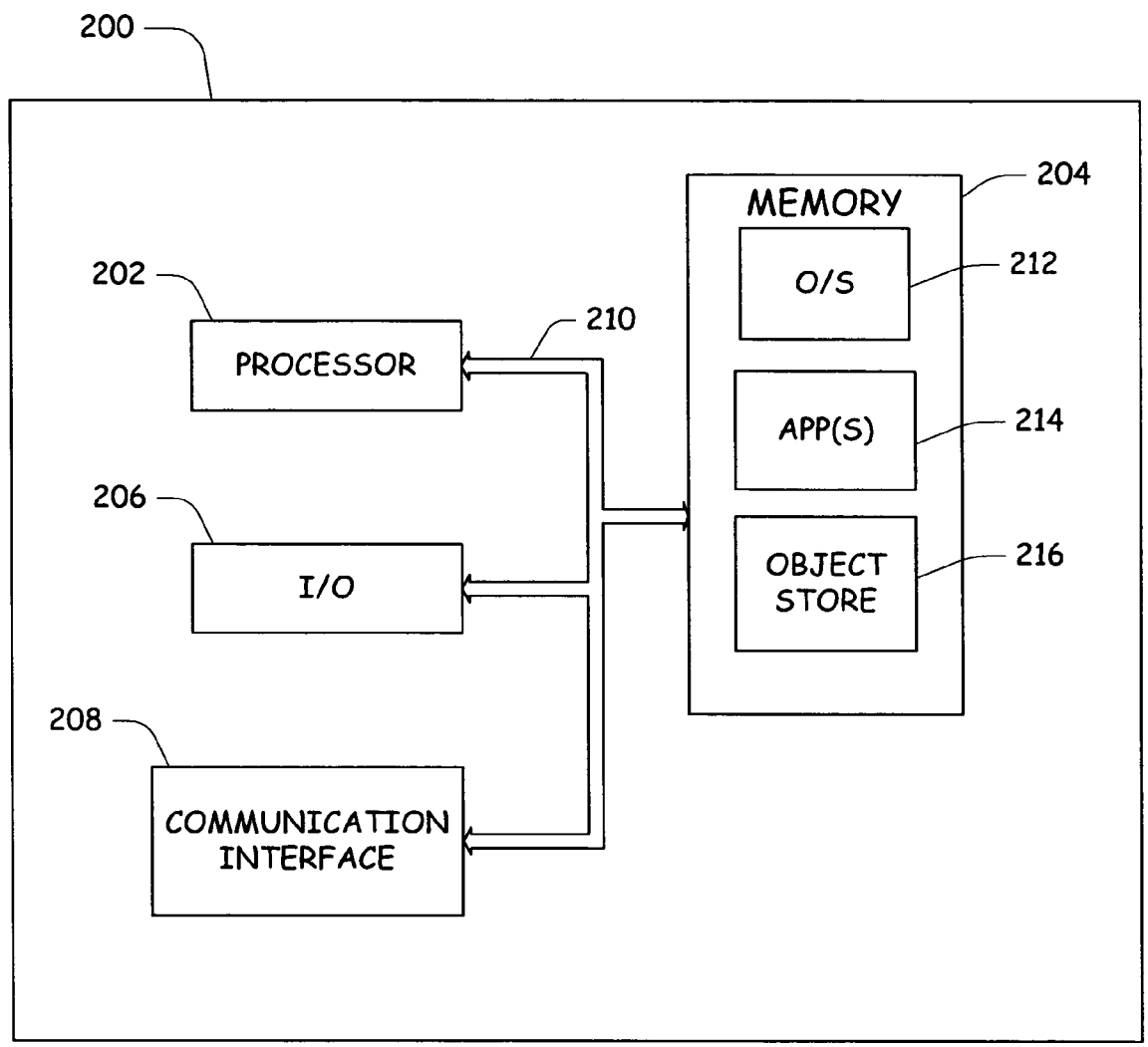
FIG. 2 is a block diagram of a mobile computing device.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one embodiment, is a WINDOWS® Mobile brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Figure 3:
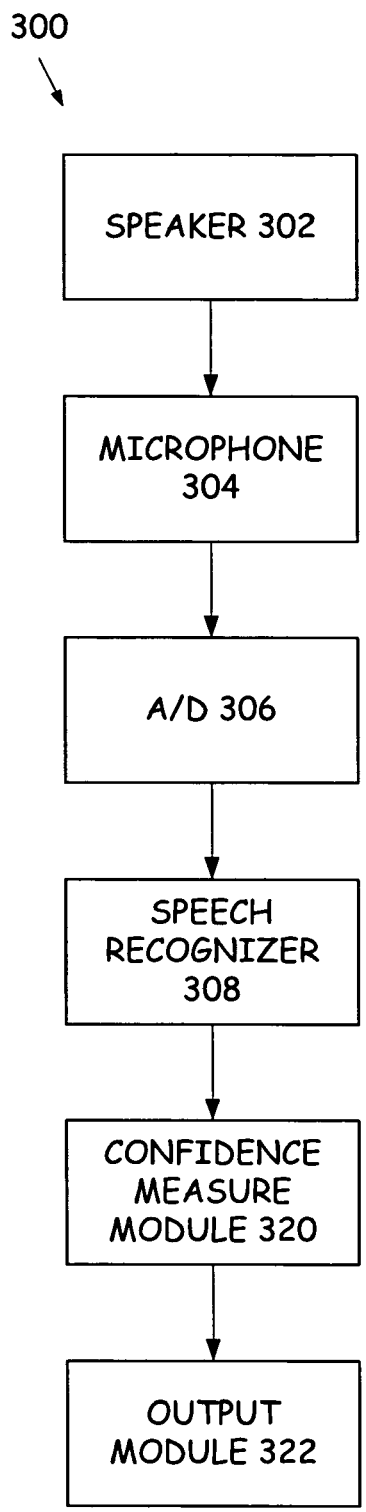
FIG. 3 is a block diagram of a speech recognition system.

FIG. 3 provides a block diagram of a speech recognition system 300. In FIG. 3, a speaker 302 speaks into a microphone 304. Microphone 304 can be directly connected to a computer or be remote from the computer, for example be coupled to the computer by a telephone network. For example, microphone can be part of mobile device 200. Audio signals detected by microphone 304 are converted into electrical signals that are provided to analog-to-digital converter 306. A-to-D converter 306 converts the analog signal from microphone 304 into a series of digital values. These digital values are provided to a speech recognizer 308. Speech recognizer 308 identifies one or more likely words based on the signals from A/D converter 306. Speech recognizer 308 also utilizes a lexicon, a language model (for example, based on an N-gram, context-free grammars, or hybrids thereof), and an acoustic model to provide a hypothesis of a word on words that were spoken.

The most probable hypothesis word(s) are provided to a confidence measure module 320. Confidence measure module 320 identifies which words are most likely to have been properly identified by speech recognizer 308 as a recognition result. Confidence measure module 320 then provides the hypothesis word(s) to an output module 322 along with a score corresponding to the likelihood that the recognition result corresponds to the content of what was spoken by speaker 302. Output module 322 performs tasks based on the recognition result and the score. Output module 322 can utilize one or more confidence thresholds in determining what tasks to perform. For example, a simple yes/no question may have a single confidence threshold. Other, more complex situations can have two, three or more confidence thresholds.

Figure 4:
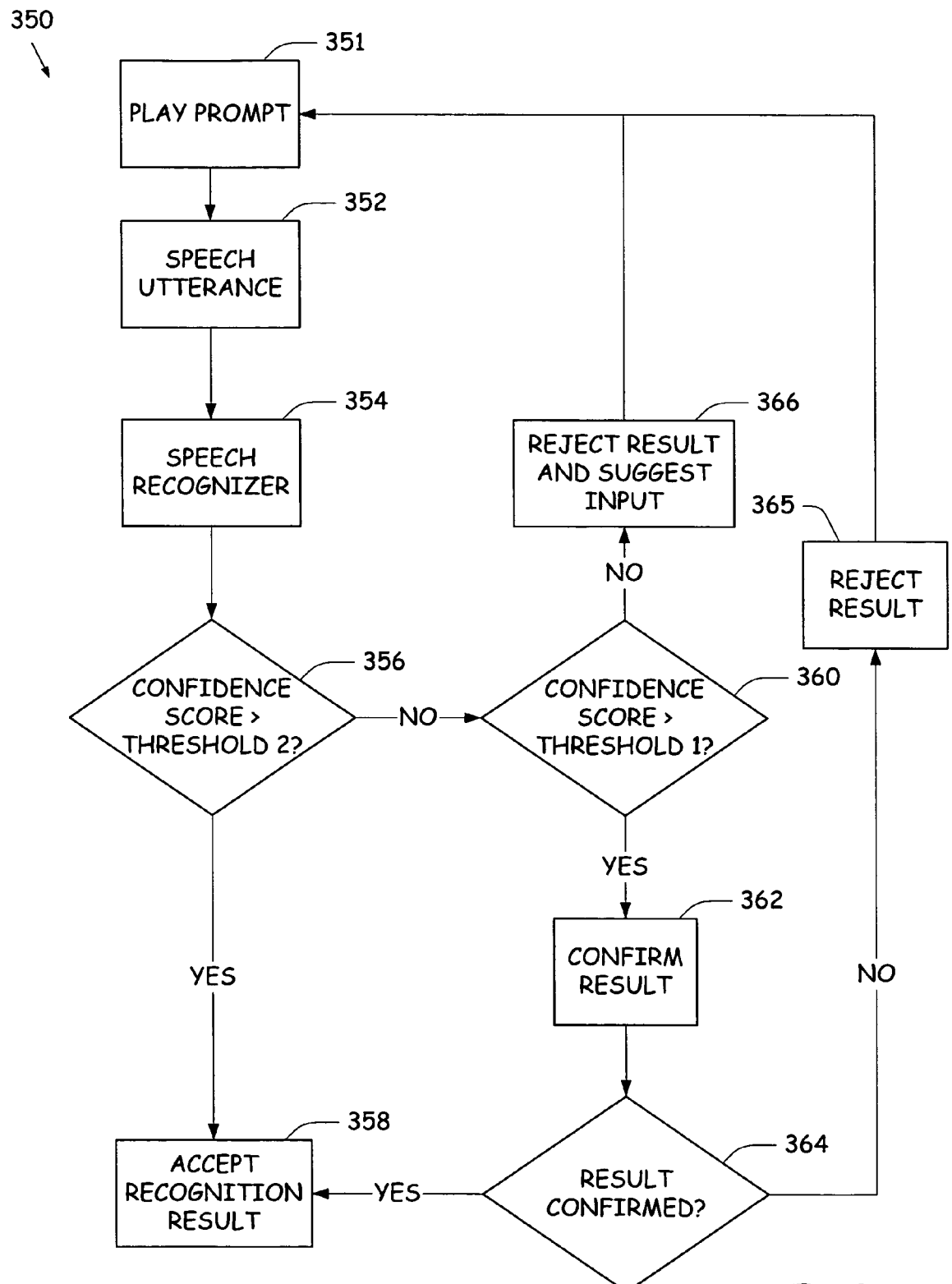
FIG. 4 is a flow diagram of a method in a speech application.

FIG. 4 is a flow diagram of a method 350 for an exemplary speech application. Method 350 relates to a dialog turn, where a prompt is played and a user provides a response. The speech application uses two thresholds, although one or more thresholds can be used depending on the particular application. Method 350 begins at step 351 wherein a user is prompted for a speech utterance. A speech utterance is received at step 352. It is worth noting that the speech utterance can be received before the prompt has finished playing. Such a situation is referred to as "barge-in". Although barge-in can provide enhanced functionality and user experience of the speech application, it can also lead to timing problems.

At step 354, the speech utterance is recognized using a speech recognizer. The speech recognizer can utilize one or more grammars to determine a recognition result in the speech utterance. For example, a name-dialer application can include a grammar of all names in a directory. Additionally, the speech recognizer returns a confidence score for the recognition result based on the likelihood that the recognition result corresponds to the content of the speech utterance. Various methods and systems can be used to recognize the speech and compute the confidence score.

The speech application then determines at step 356 whether the confidence score for the recognition result is greater than an upper threshold, herein referred to as threshold 2 (TH2). If the confidence score is greater than TH2, the recognition result is accepted at step 358. The transaction is then complete and any tasks associated with the transaction are performed based on the recognition result. If it is determined that the confidence score is less than TH2, the speech application will determine if the confidence score is greater than a lower threshold, herein referred to as threshold 1 (TH1), at step 360.

If the confidence score is greater than TH1, the speech application proceeds to step 362, wherein the recognition result is confirmed. The confirmation can be a single choice (for example a choice between yes/no) or a multiple choice (for example a choice among options 1, 2, 3, etc.). The confirmation process itself can include its own thresholds. The speech application then determines, at step 364, whether the recognition result was confirmed by the user. If the result was confirmed, the speech application proceeds to step 358, wherein the recognition result is accepted as described above. If the recognition result is not confirmed, the speech application will reject the result at step 365 and start over and return to step 351, wherein a prompt is played. Alternatively, the application can change a dialog flow after a user fails multiple times. For confidence scores that are less than TH1, the speech application proceeds to step 356. Since the confidence score is particularly low for the recognition result, expected input can be suggested by the speech application. For example, if the application expects a name, the application can suggest the user say a name.

Figure 5:
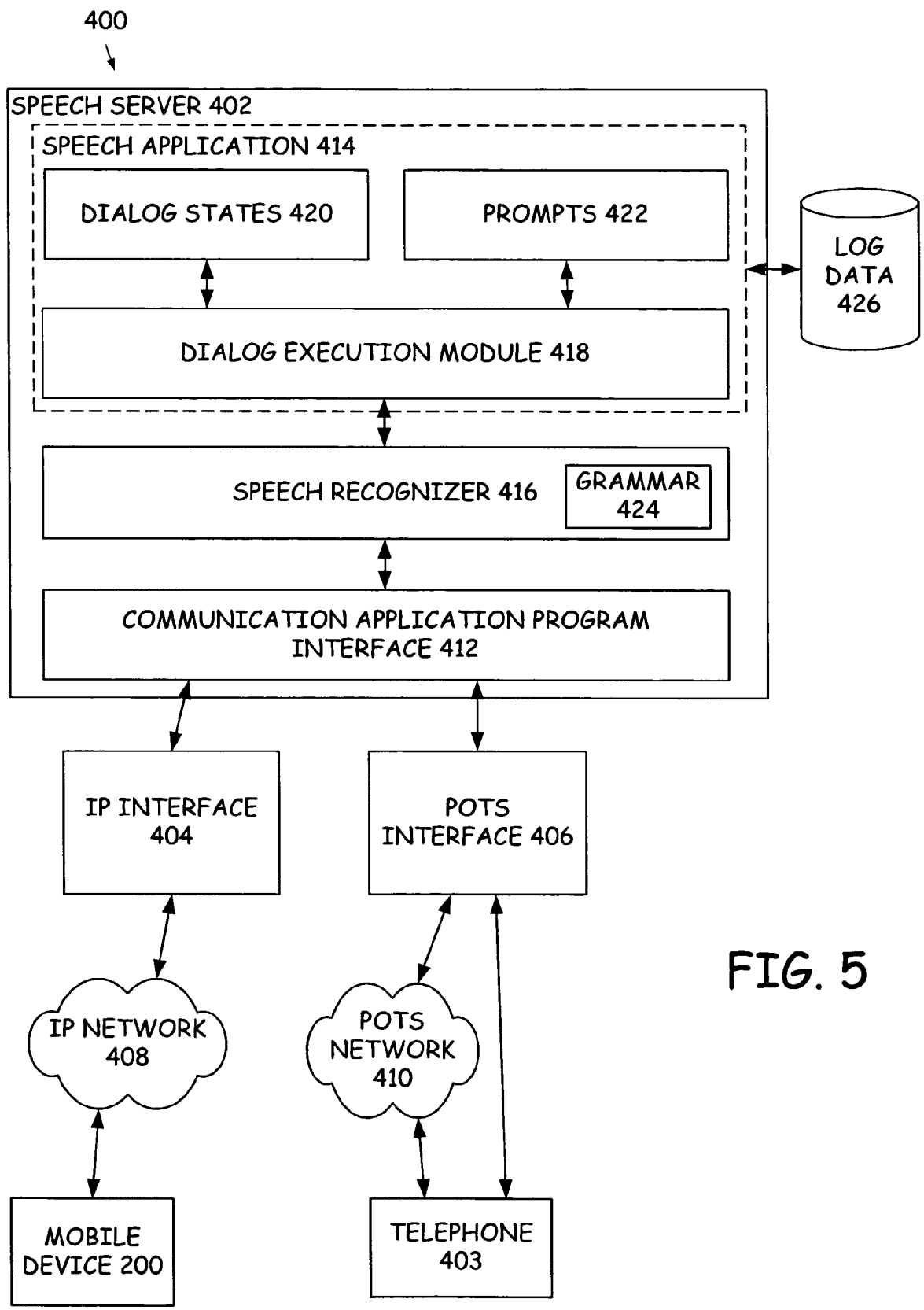
FIG. 5 is a block diagram of an architecture for a client/server system.

FIG. 5 illustrates an exemplary communication architecture 400 with a speech server 402. Speech server 402 receives speech from an initiator and performs tasks based on the speech. An initiator can include a person, a device, a telephone, a remote personal information manager, etc. that connects to speech server 402. Tasks are performed by speech server 402 based on speech from an initiator.

In one embodiment, speech server 402 can be implemented on a general purpose computer such as computer 110 discussed above. An initiator can contact speech server 402 through a number of different modes of communication. Generally, speech server 402 can be accessed through a client such as mobile device 200 (which herein also represents other forms of computing devices having a display screen, a microphone, a camera, a touch sensitive panel, etc., as required based on the form of input), or through phone 403, wherein communication is made audibly or through tones generated by phone 403 in response to keys depressed and wherein information from speech server 402 can be provided audibly back to the user.

More importantly though, speech server 402 is unified in that whether information is obtained through device 200 or phone 403, speech server 402 can support either mode of operation. Speech server 402 is operably coupled to multiple interfaces to receive communication messages. Thus, speech server 402 can provide a response to different types of devices based on a mode of communication for the device.

IP interface 404 receives and transmits information using packet switching technologies, for example using TCP/IP (Transmission Control Protocol/Internet Protocol). A computing device communicating using an internet protocol can thus interface with IP interface 404.

POTS (Plain Old Telephone System, also referred to as Plain Old Telephone Service) interface 406 can interface with any type of circuit switching system including a Public Switch Telephone Network (PSTN), a private network (for example a corporate Private Branch Exchange (PBX)) and/or combinations thereof. Thus, POTS interface 406 can include an FXO (Foreign Exchange Office) interface and an FXS (Foreign Exchange Station) interface for receiving information using circuit switching technologies.

IP interface 404 and POTS interface 406 can be embodied in a single device such as an analog telephony adapter (ATA). Other devices that can interface and transport audio data between a computer and a POTS can be used, such as "voice modems" that connect a POTS to a computer using a telephone application program interface (TAPI).

As illustrated in FIG. 5, mobile device 200 and speech server 402 are commonly connected, and separately addressable, through a network 408, herein a wide area network such as the Internet. It therefore is not necessary that mobile device 200 and speech server 402 be physically located adjacent each other. Device 200 can transmit data, for example speech, text and video data, using a specified protocol to IP interface 404. In one embodiment, communication between device 200 and IP interface 404 uses standardized protocols, for example SIP with RTP (Session Initiator Protocol with Realtime Transport Protocol), both Internet Engineering Task Force (IETF) standards.

Access to speech server 402 through phone 403 includes connection of phone 403 to a wired or wireless telephone network 410 that, in turn, connects phone 403 to speech server 402 through a FXO interface. Alternatively, phone 403 can directly connect to speech server 402 through a FXS interface, which is a part of POTS interface 406.

Both IP interface 404 and POTS interface 406 connect to speech server 402 through a communication application programming interface (API) 412. One implementation of communication API 412 is Microsoft Real-Time Communication (RTC) Client API, developed by Microsoft Corporation of Redmond, Wash. Another implementation of communication API 412 is the Computer Supported Telecommunication Architecture (ECMA-269/ISO 18051), or CSTA, an ISO/ECMA standard. Communication API 412 can facilitate multimodal communication applications, including applications for communication between two computers, between two phones and between a phone and a computer. Communication API 412 can also support audio and video calls, text-based messaging and application sharing. Thus, speech server 402 is able to initiate communication to mobile device 200 and/or phone 403.

Speech server 402 also includes an interactive speech application 414 and a speech recognizer 416. Application 414 includes a dialog execution module 418, dialog states 420 and prompts 422. Dialog execution module 418 includes logic to handle text recognized by speech recognizer 418 as well as performs tasks based on dialog states 420. These tasks can include transmitting a prompt from prompts 422.

Dialog execution module 418 utilizes speech recognizer 416 to drive application 414 based on speech input from an initiator. Recognizer 416 includes a recognition engine that is used to identify features in the user input. Recognition features for speech are usually words in the spoken language. In one particular example, a language model such as a grammar 424 can be used to recognize text within a speech utterance. More than one grammar can also be used, for example, for each dialog turn and/or a particular semantic item for speech application 414.

Dialog execution module 418 can use words recognized by recognizer 416 to determine a desired dialog state from dialog states 420. Dialog execution module 418 also accesses prompts 422 to provide an output to a person based on user input. Dialog states 420 can be stored as one or more files to be accessed by dialog execution module 418. Prompts 422 can be integrated into dialog states 420 or stored and accessed separately from dialog states 420. Prompts can be stored as text, audio and/or video data that is transmitted via communication API 412 to a user based on a request from the user, for example, an initial prompt may include, "Welcome to Acme Company Help Center, how can I help you?" The prompt is transmitted based on a mode of communication for the user. If the user connects to speech server 404 using a phone, the prompt can be played audibly through the phone.

In operation, dialog execution module 418 interprets speech received from a user in order to traverse through a dialog that includes a plurality of dialog states, for example dialog states 420. In one embodiment, the dialog can be configured as a help center with prompts for use in answering questions from a user. The dialog states 420 can be stored as a file to be accessed by dialog execution module 418. The file can be authored independent of a particular communication mode that is used by a user to access speech server 402. Thus, dialog execution module 418 can include an application programming interface (API) to access dialog states 420.

Figure 6:
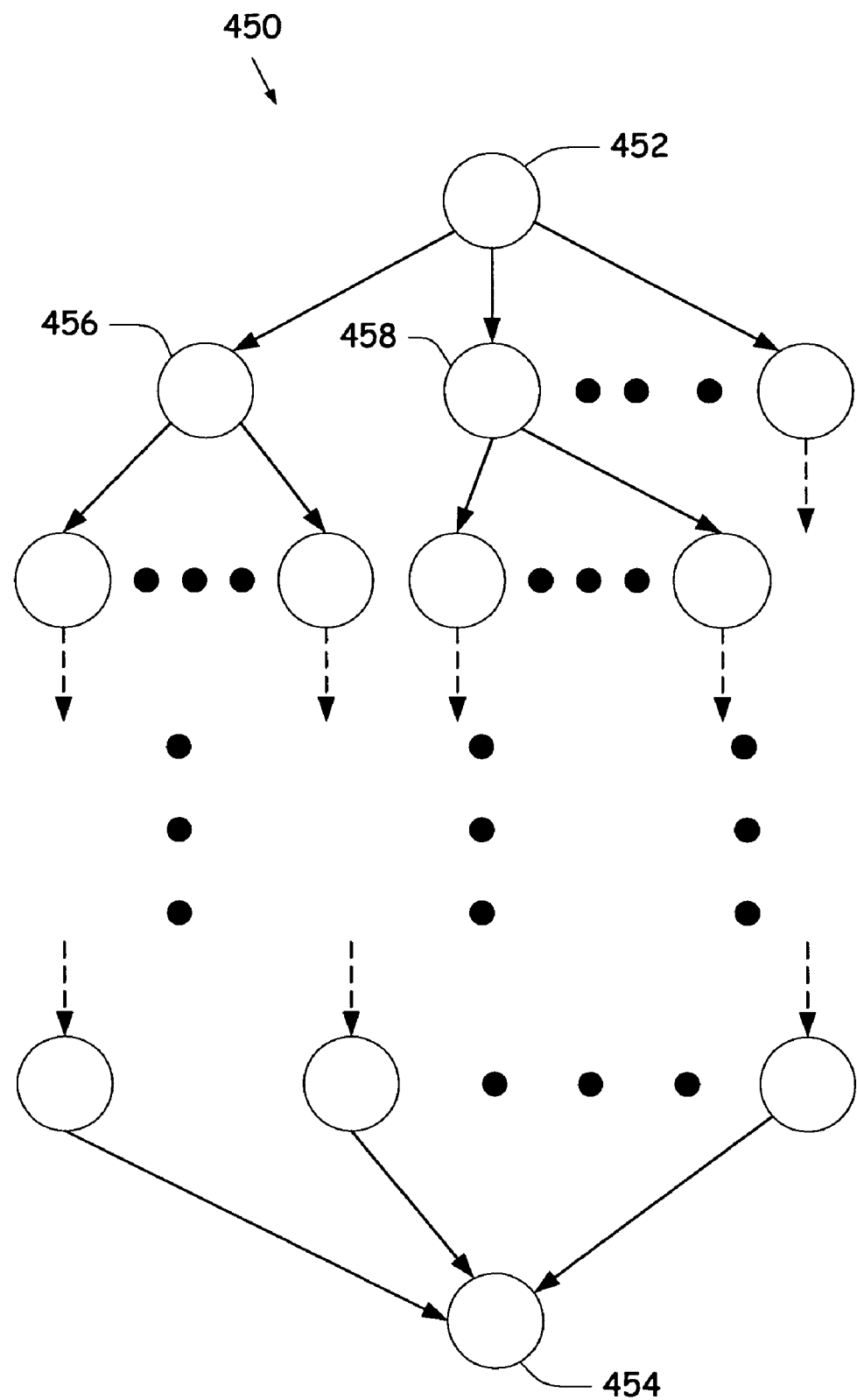
FIG. 6 is a block diagram of a dialog.

FIG. 6 is a diagram of an exemplary dialog 450 including a plurality of dialog states. Each state is represented by a circle and arrows represent transitions between two states. Dialog 450 includes an initial state 452 and an end state 454. After a user connects to server 402, dialog 450 is initiated and begins with state 452. State 452 can include one or more processes or tasks to be performed. For example, dialog state 452 can include a welcome prompt to be played and/or transmitted to the user. During the initial state 452, speech can be received. Based on the speech received, dialog 450 moves to a next state. For example, dialog 450 can transition to state 456, state 458, etc. Each of these states can include further associated tasks and prompts to conduct a dialog with the user. These states also include transitions to other states in dialog 450. Dialog 450 can be traversed until end state 454 is reached.

However, in some instances, dialog 450 is not completely traversed. This situation can be a result of user experience problems with speech application 414. Determining one or more causes of user experience problems in speech application 414 can be a lengthy and resource intensive process. The process can require manual analysis and transcription of hundreds of individual utterances (itself an error-prone process) for an application that is under trial or under deployment. An analyst can be required to hold a reasonably detailed knowledge both of fundamentals of speech recognition systems and of speech application 414. While symptoms of poor user experiences can be self-evident (poor or low-confidence recognition results, high levels of abandonment and/or low task completion rates), causes of these symptoms are more difficult to determine automatically. Causes can belong to any of a number of problem classes, including inadequate grammar coverage, flawed pronunciations, user confusion resulting from an unclear prompt, dialog flow issues, barge-in, turn-taking mismatches and other issues.

Referring to FIG. 5, to aid in analyzing speech application 414, log data 426 can be obtained by recording information related to speech application 414 during trial and/or deployment. From log data 426, improper barge-ins and timing issues can automatically be found with regard to speech application 414. Furthermore, probable causes for problems can be suggested. Analyzing speech application 414 can thus be performed faster and with less resources. This process can speed up analysis of speech application 414 by isolating a portion of data obtained from speech application 414 that is known to demonstrate a particular problem. Furthermore, the process can automatically identify causes that an analyst can verify without extensive manual involvement. Additionally, isolation of known timing data can enable cleaner analysis of other portions of log data 426.

Log data 426 can include recorded audio from calls between a user and speech application 414. Additionally, log data can include information indicative of failed recognitions and a particular turn for the failed recognition as discussed below. Time stamp data, including times when a particular dialog state begins, when a response is received and when tasks are completed can also be recorded. Grammar and prompt information utilized by application 414 as well as perceived responses from a user can also be included in log data 426. U.S. patent application Ser. No. 11/170,808 entitled "Speech Application Instrumentation and Logging" describes an approach to log speech data from an application.

Information indicative of completion of tasks in a speech application can be referred to as dialog data. This data quantifies success or failure of completing the task. In addition, the dialog data can include a reason if the task is unsuccessful or fails, or if applicable the reason for succeeding if multiple reasons are possible for succeeding. Additional data can include progress data indicating if the user did not provide a response or the speech recognizer could not recognize the utterance. A list of input field values or status thereof that changed can also be recorded.

Turn data comprises direct interaction with the application and is organized based on prompts provided by the application (when no response is expected), or application prompts correlated to user responses or lack thereof, in other words a prompt/response exchange. Data that can be recorded includes information related to the prompt provided by the application including the purpose of the prompt, the response provided by the user including the purpose of the response, and the recognition result determined by the system.

Figure 7:
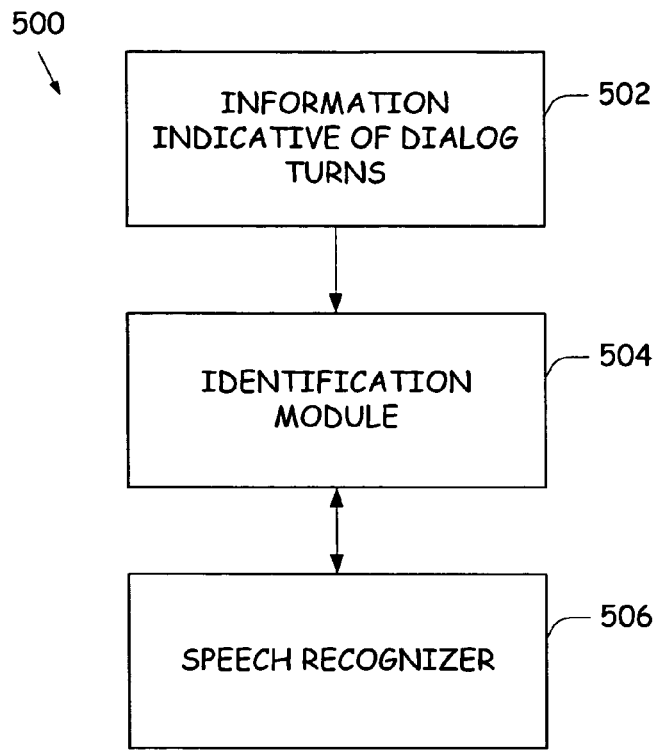
FIG. 7 is a block diagram of a system for analyzing dialog of an application.

FIG. 7 is a block diagram of a system 500 used for analyzing speech application 414. System 500 is adapted to identify problems within a dialog for speech application 414. In particular, system 500 can identify barge-in problems, for example those caused by prompt echo. Prompt echo can happen in speaker phone scenarios (and some telephony configurations) when a prompt provided by the speech application is heard as speech to the speech application and is treated by the speech application as user input. By identifying these problems, an analyst can investigate causes that may relate to telephony card or gateway configuration and/or system prompt volume.

Furthermore, system 500 can identify failed recognitions caused by turn-taking mismatches. This situation can occur when turn-taking between the application and the user is not aligned. For example, the user can speak when the application is not expecting speech (e.g. the user tries to barge-in when the system has not enabled barge-in) or the user otherwise is out-of-turn with the system. By identifying these problems, an analyst can change barge-in configurations and/or prompt or dialog structure.

System 500 includes information indicative of dialog turn 502, identification module 504 and speech recognizer 506. Information 502 includes log data 426 from FIG. 5. For example, this information can include recorded audio from speech application 414 under trial and/or under deployment. Furthermore, information 502 can contain information related to one or more prompts, responses, grammars, time stamps, etc. provided during operation of speech application 414.

Figure 8:
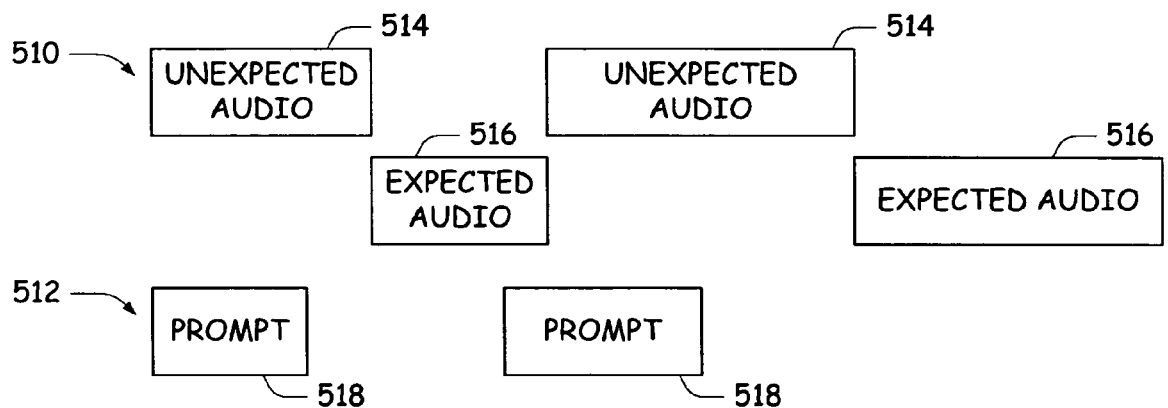
FIG. 8 is a diagram of an input channel and an output channel for a speech application.

Additionally, information 502 can include recorded audio having both expected audio, which was received when speech application 414 was expecting to receive audio from a user, and unexpected audio, which was received by speech application 414 when audio was not expected from the user. With reference to FIG. 8, speech application 414 includes an input channel 510 for receiving speech from a user and an output channel 512 for providing audio to a user. The input channel may not be enabled at times. Speech application 414 can include situations in which barge-in is not enabled. Thus, speech application 414 is not listening for speech input from the user. Still, the user can supply audio during this time, which ends up being ignored by speech application 414. This audio is referred to as unexpected audio, referenced in FIG. 8 at 514. Expected audio is referenced at 516 and prompts are referenced at 518. However, as discussed below, this unexpected audio can be used during analysis.

Referring back to FIG. 7, identification module 504 is used to identify instances within information 502. For example, identification module 504 can identify problem recognition data. This data includes a set of all speech recognitions within speech application 414 that have failed. Failed recognitions can include situations where speech application 414 was unable to match speech input from a user with an associated grammar (this can be referred to as a "no recognition event"). Furthermore, failed recognitions can include situations where speech application 414 has recognized some speech, but a confidence value associate with recognition is below a confidence threshold of the application. Furthermore, failed recognitions can include situations where speech application 414 has recognized some speech and calculated a high enough confidence value for application 414 to proceed further, but an associated object of the speech input was later denied or otherwise cleared by the user. This situation is indicated by an explicit confirmation cycle in which a user is prompted whether user spoke a certain object or not and a user replies no or by the failure of the dialog in which the recognition is contained. For example, this can result from a user hang-up, cancellation or other form of abandonment.

Identification module 504 can also isolate expected audio and unexpected audio to form an actual response from a user. For example, unexpected audio from a user could include, "I want to fly from Seattle to", and the expected audio received by speech application 414 merely included the word "Boston". In this situation, identification module 504 can isolate the expected audio and the unexpected audio to form the actual response "I would like to fly from Seattle to Boston."

Speech recognizer 506 is used to perform speech recognition on information identified by identification module 504. For example, speech recognizer 506 can perform recognition on responses that were identified by speech application 414 using a grammar that includes a greater vocabulary of words and phrases than an original grammar used by speech application 414. Furthermore, speech recognizer 506 can perform recognition on actual responses that are isolated from expected audio and unexpected audio. In this case, speech recognizer 506 can use the same or similar grammar to the grammar used in speech application 414.

Figure 9:
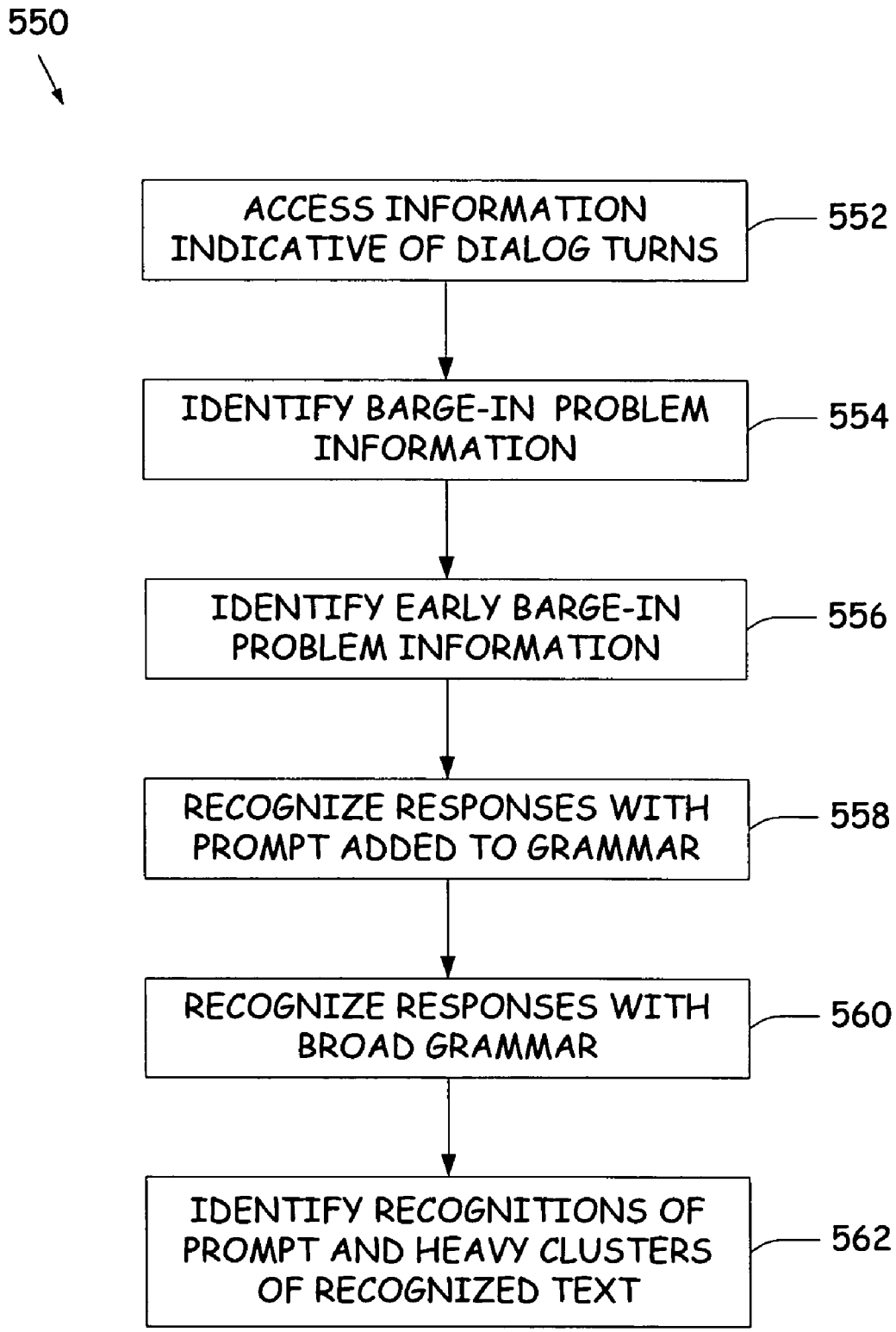
FIG. 9 is a flow chart of a method of identifying problems in a speech application.

FIG. 9 is a method that can be performed by system 500 to identify barge-in problems in speech application 414. Method 550 begins at step 552 wherein information indicative of dialog turns is accessed. This information includes information 502 from FIG. 7. At step 554, identification module 504 can identify barge-in problem information. This information includes situations in which a failed recognition has been identified and speech application 414 has determined that a barge-in situation has been presented. As discussed above, a barge-in situation exists when audio input is deemed to be received from a user before an associated prompt has completed.

A subset of the barge-in problem information is identified at step 556, wherein early barge-in information is identified. Step 556 determines whether or not barge-in information was received within a particular short time period from when the associated prompt began. For example, the time period is likely to be a few milliseconds, a second or some period therebetween. This time period can be specified according to an aggregation of system latencies that can be identified between the time the application starts a prompt playback and a time in which a very early recognition event can cause barge-in. Step 556 can thus define a period that includes a maximum time possible for prompt audio to cause cut-off of the prompt since the prompt was processed by speech application 414 as user input. Additionally, the time period can depend on a load on the resources of the system executing the speech application at any particular time and thus can be adjusted to reflect the load.

At step 558, responses from the early barge-in problem information are recognized with an associated prompt added to a grammar that was utilized during operation of speech application 414. The grammar can allow for multiple versions of the prompt, word-by-word. For instance, the prompt "Good morning, who would you like to contact today?" with barge-in enabled from the beginning of the prompt can include various combinations of text within the prompt. If text within the response is recognized during step 558, this text can be an indication that prompt echo is causing failed recognitions within speech application 414. For example, if the term "morning" is recognized a large number of times from information 502, it is likely that prompt echo is causing problems within speech application 414.

If desired, step 560 of method 550 can recognize responses with a broad grammar, such as one used for transcription. Step 560 conducts a recognition of utterances from the early barge-in information using a large grammar and/or using both the original grammar utilized by speech application 414 and a much bigger grammar in parallel. At step 562, recognitions of the prompt and other regularities in the recognized text can be identified and clustered together. These clusters can provide valuable information for an analyst to analyze application 414. For example, the clusters can indicate that words from a prompt are being recognized and/or that terms should be added to the grammar used in speech application 414.

Figure 10:
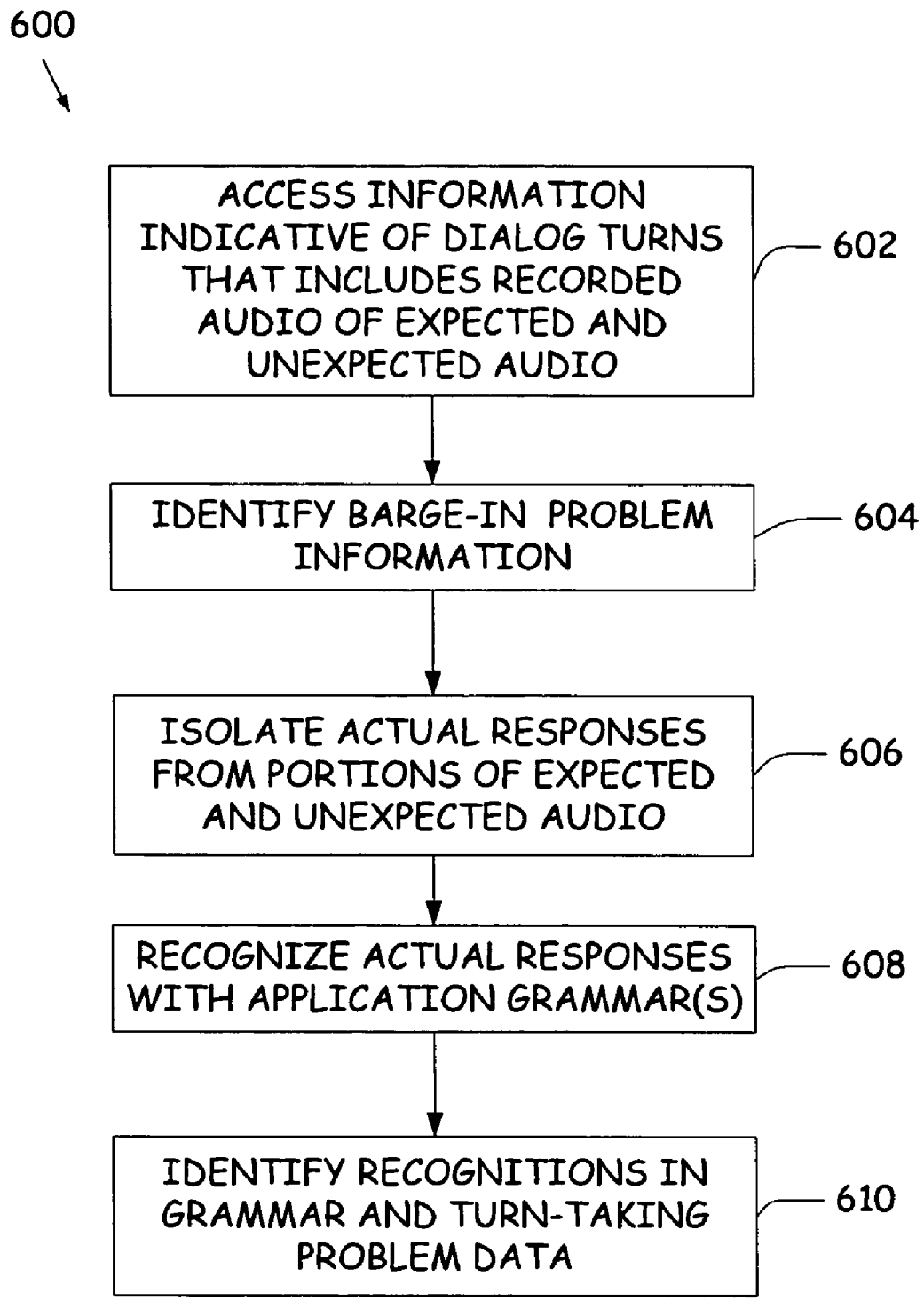
FIG. 10 is a flow diagram of a method of identifying problems in a speech application.

FIG. 10 is a method 600 that can be performed by system 500. At step 602, information indicative of dialog turns that includes recorded audio of expected and unexpected audio is accessed. As discussed above, expected audio is received when speech application 414 is listening for a response from a user and unexpected audio is recorded when speech application 414 is not listening for audio from the user. At step 604, barge-in problem information is identified. This step is similar to step 554 of FIG. 9. At step 606, actual responses from portions of expected audio and unexpected audio are isolated. Those portions of the unexpected audio close to a particular segment of expected audio is sequenced into an actual response in order to provide a complete actual response on all input audio that corresponds to input from a user. Boundaries of the actual response can be determined by ends of a dialog turn. In this manner, the complete user input audio (i.e. the actual response) can be used.

At step 608, recognition is performed on the actual responses with the grammar utilized by speech application 514. The actual responses formed by the combination of expected and unexpected audio can be more indicative of what a user was intending to say. At step 610, recognitions in the application grammar are identified and turn-taking problem data is identified. This data includes those results from the recognition performed in step 608 that have matched a path in the speech application grammar with a reasonable confidence threshold. These results provide an indication that the actual response represents a response from the user that is associated with the application grammar. However, the original recognition failed because of timing issues. For example, these timing issues can relate to problems where the speech application was not listening to part or all of the user utterance. The data identified in step 610 includes failed recognitions that are associated with successful recognitions during step 608 and thus can be identified cleanly as data with utterance that represents turn-taking problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of analyzing dialog between a user and an interactive application having dialog turns, wherein a turn comprises a prompt from the application and a response received from the user, the method comprising:
   accessing stored information indicative of audible responses to prompts received from the at least one user during a plurality of dialog turns between the application and at least one user;
   identifying, using a processor of the computer, instances from the accessed information where the application determined a response was received from the at least one user before an associated prompt had completed, wherein the accessed information comprises information related to operation of the application with a first grammar to recognize the response;
   identifying whether the response was received in a particular limited time period from when the associated prompt began; and
   if the response was received in the limited time period, determining whether the response included one or more terms from the associated prompt by performing recognition on the response using a second grammar having more information related to grammar of a language than the first grammar, wherein terms from the associated prompt are added to the second grammar.

2. The method of claim 1 and further comprising identifying a plurality of instances where the application determined responses were received from the at least one user before an associated prompt had completed and identifying clusters of words from the responses using a grammar while performing recognition on the responses.

3. The method of claim 1 and further comprising identifying failed recognition situations from the information indicative of dialog turns between the application and at least one user.

4. The method of claim 1 wherein the information indicative of dialog turns between the application and the at least one user includes recorded audio having expected audio that was received by the application when the application was expecting a response and unexpected audio that was received by the application when the application was not expecting a response.

5. The method of claim 4, and further comprising isolating the expected audio and unexpected audio to form an actual response provided by the user, the actual response including both the expected audio and the unexpected audio.

6. The method of claim 5, wherein isolating comprises determining boundaries of the actual response in the expected audio and unexpected audio and combining the expected audio and unexpected audio to form the actual response based on closeness of the expected audio and the unexpected audio.

7. The method of claim 6, wherein the boundaries of the actual response are based on ends of the dialog turn comprising the associated prompt and the response to the associated prompt.

8. A computer implemented method of analyzing dialog between a user and an interactive application having dialog turns, wherein a turn comprises a prompt from the application and a response received from the user, the method comprising:
   accessing stored log data including information indicative of a plurality of dialog turns between the application and at least one user, the stored log data comprising recorded audio;
   identifying at least one failed recognition situation from the information indicative of the plurality of dialog turns between the application and at least one user;
   based on identifying the at least one failed recognition situation, accessing the recorded audio to identify a portion of expected audio that was received by the application when the application was expecting a response from the at least one user for a prompt that was given, the prompt being associated with the at least one failed recognition situation;
   accessing the recorded audio to identify a portion of unexpected audio that was received by the application when the application was not expecting a response from the at least one user for the prompt that was given;
   isolating the portion of expected audio and the portion of unexpected audio to form an actual response provided by the user, the actual response including both the expected audio and the unexpected audio; and
   performing recognition on the actual response using a processor of the computer.

9. The method of claim 8 wherein the accessed information comprises information related to operation of the application with a grammar and wherein performing recognition includes utilizing the grammar.

10. The method of claim 8, wherein isolating comprises determining boundaries of the actual response in the expected audio and unexpected audio and combining the expected audio and unexpected audio to form the actual response based on closeness of the expected audio and the unexpected audio.

11. The method of claim 10, wherein the boundaries of the actual response are based on ends of the dialog turn comprising the prompt.

12. The method of claim 8 wherein performing recognition includes recognizing the actual response.

13. The method of claim 8, wherein the accessed information comprising information related to operation of the application for the at least one failed recognition situation, wherein performing recognition on the actual response comprises performing recognition using a second grammar, wherein terms from the prompt are added to the second grammar.

14. A system for analyzing dialog between a user and an interactive application having dialog turns, wherein a turn comprises a prompt from the application and a response received from the user, the system comprising:
- a database storing log data including information that is related to operation of the application using a first grammar and is indicative of a plurality of dialog turns between the application and at least one user, wherein the stored log data pertains to a plurality of instances where the application determined responses were received from the at least one user before prompts associated with the responses had completed;
- an identification module adapted to access the log data and identify failed recognitions from the information stored in the database where the application determined a response to an associated prompt was received from the at least one user before the associated prompt had completed, wherein the information includes recorded audio related to expected audio that was received by the application when the application was expecting a response and unexpected audio that was received by the application when the application was not expecting a response; and
- a recognizer implemented on a processor of a computer to perform recognition on the response, wherein the recognizer utilizes a second grammar to perform recognition on the response and determine if terms from the associated prompt are in the response, the second grammar having more information related to grammar of a language than the first grammar and including information related to the associated prompt.

15. The system of claim 14 wherein the identification module is further adapted to isolate a portion of expected audio and a portion of unexpected audio to form an actual response given by the at least one user.

16. The system of claim 15, wherein the recognizer is adapted to perform recognition on the actual response.

17. The system of claim 16, wherein the identification module is adapted to determine boundaries of the actual response in the expected audio and unexpected audio and combine the expected audio and unexpected audio to form the actual response based on closeness of the expected audio and the unexpected audio.

18. The system of claim 17, wherein the boundaries of the actual response are determined based on ends of the dialog turn comprising the associated prompt and the response to the associated prompt.

\* \* \* \* \*